United States Patent
Shimizu et al.

(10) Patent No.: US 10,762,037 B2
(45) Date of Patent: Sep. 1, 2020

(54) DATA PROCESSING SYSTEM

(71) Applicant: Hitachi, Ltd., Tokyo (JP)

(72) Inventors: Akira Shimizu, Tokyo (JP); Takuya Isozaki, Tokyo (JP); Norihiro Hara, Tokyo (JP)

(73) Assignee: HITACHI, LTD, Tokyo (JP)

( * ) Notice: Subject to any disclaimer, the term of this patent is extended or adjusted under 35 U.S.C. 154(b) by 305 days.

(21) Appl. No.: 15/750,662

(22) PCT Filed: Mar. 25, 2016

(86) PCT No.: PCT/JP2016/059567
§ 371 (c)(1),
(2) Date: Feb. 6, 2018

(87) PCT Pub. No.: WO2017/163393
PCT Pub. Date: Sep. 28, 2017

(65) Prior Publication Data
US 2019/0018851 A1    Jan. 17, 2019

(51) Int. Cl.
*G06F 16/00* (2019.01)
*G06F 16/11* (2019.01)
(Continued)

(52) U.S. Cl.
CPC ............ *G06F 16/113* (2019.01); *G06F 16/13* (2019.01); *G06F 16/221* (2019.01);
(Continued)

(58) Field of Classification Search
CPC .................. G06F 16/113; G06F 16/221; G06F 16/24534; G06F 16/258; G06F 16/2453;
(Continued)

(56) References Cited

U.S. PATENT DOCUMENTS 8,972,388 B1 * 3/2015 Finkelstein ........... G06F 3/0237
707/723
2006/0074858 A1 * 4/2006 Etzold ............... G06F 16/24549
(Continued)

FOREIGN PATENT DOCUMENTS

JP    2000-132442 A    5/2000

OTHER PUBLICATIONS

International Search Report of PCT/JP2016/059567 dated May 17, 2016.

*Primary Examiner* — Anh Ly
(74) *Attorney, Agent, or Firm* — Mattingly & Malur, PC

(57) ABSTRACT

A data processing system according to an embodiment of the present invention may manage one or more tables and a plurality of archive files including one or more records extracted from the table. Upon receiving a search request for the table, the data processing system may generate a query (first partial query) to search for a record from the table corresponding to a condition specified by the search request, and generate a query (second partial query) to identify the archive file including the record extracted from the table specified as a search target in the search request, and search the identified archive file for the record corresponding to the condition specified by the search request. A query for deriving a union of the output results of the first partial query and the second partial query may be generated, and processing related to the generated query may be executed in parallel.

12 Claims, 15 Drawing Sheets

(51) Int. Cl.
*G06F 16/2453* (2019.01)
*G06F 16/22* (2019.01)
*G06F 16/25* (2019.01)
*G06F 16/13* (2019.01)

(52) U.S. Cl.
CPC .... *G06F 16/2453* (2019.01); *G06F 16/24532* (2019.01); *G06F 16/24534* (2019.01); *G06F 16/254* (2019.01); *G06F 16/258* (2019.01)

(58) Field of Classification Search
CPC .. G06F 16/24532; G06F 16/13; G06F 16/254; G06F 16/00; G06F 3/0649; G06F 11/1446; G06F 17/227; G06F 17/2785; G06F 17/27; G06F 17/30; G06F 3/0601; G06F 16/9535; G06F 3/011; G06F 16/176; G06F 17/30165; G06G 16/968; G06N 20/00; G06Q 50/01; H04L 67/1097; H04L 67/2842; H04L 12/44; G10L 15/22; G06K 9/00315; G06K 9/00268

See application file for complete search history.

(56) References Cited

U.S. PATENT DOCUMENTS

| | | | |
|---|---|---|---|
| 2010/0332401 A1* | 12/2010 | Prahlad | G06F 3/0649 705/80 |
| 2013/0124466 A1* | 5/2013 | Naidu | G06F 8/453 707/610 |
| 2014/0046926 A1* | 2/2014 | Walton | G06Q 50/22 707/710 |
| 2014/0129583 A1* | 5/2014 | Munkes | G06F 16/9032 707/760 |
| 2017/0116289 A1* | 4/2017 | Deshmukh | G06F 16/24535 |
| 2017/0223003 A1* | 8/2017 | Miles | H04L 63/08 |

* cited by examiner

FIG. 2

| SEQ_NO | USER_DATA | RECORD_DAY |
|---|---|---|
| 1 | AAA001 | 2012/01/01 |
| ... | ... | ... |
| 100 | AAA100 | 2012/12/31 |
| 101 | BBB101 | 2013/01/01 |
| ... | ... | ... |
| 200 | BBB200 | 2013/12/31 |
| 201 | CCC201 | 2014/01/01 |
| ... | ... | ... |
| 300 | CCC300 | 2014/12/31 |
| 100001 | DDD-20150101-10001 | 2015/01/01 |
| 100002 | DDD-20150101-10002 | 2015/01/01 |
| ... | ... | ... |
| 11000 | DDD-20150131-11000 | 2015/01/31 |
| 11001 | DDD-20150201-11001 | 2015/02/01 |
| ... | ... | ... |
| 12000 | DDD-20150228-12000 | 2015/02/28 |
| 12001 | DDD-20150301-12001 | 2015/03/01 |
| ... | ... | ... |
| 13000 | DDD-20150331-13000 | 2015/03/31 |

FIG. 6

| Schema Name | Table Identifier | Table ID | Archive Specification | Archive Directory |
|---|---|---|---|---|
| USER | TBL_01 | 100 | Y | /home/archivedir |

| Schema Name (521) | Table Identifier (522) | Column Name (523) | Column ID (524) | Data Type (525) | Data Definition Length (526) | Archive Range Column Specification (527) |
|---|---|---|---|---|---|---|
| USER | TBL_01 | SEQ_NO | 200 | INTEGER | 8 | N |
| USER | TBL_01 | USER_DATA | 201 | VARCHAR | 100 | N |
| USER | TBL_01 | RECORD_DAY | 202 | DATE | 4 | Y |

Chunk Management Table 600

File Management Table 700

FIG. 12

```
1  SELECT "SEQ_NO", "USER_DATA"
2  FROM    "USER"."TBL_01"
3  WHERE   "SEQ_NO"> x
4      AND "RECORD_DAY" BETWEEN y AND z
```

FIG. 13

```
1       SELECT "SEQ_NO", "USER_DATA"
2       FROM TABLE(
3            ADB_CSVREAD(
4               MULTISET([ '2014.tar.gz' , 'aaa.tar.gz' ],
5                       'COMPRESSION_FORMAT=GZIP;'
6               )
7            )
8         ) AS "TBL_01_ARC" ("SEQ_NO"     INTEGER,
9                            "USER_DATA"  VARCHAR(100),
10                           "RECORD_DAY" DATE)
11      WHERE "SEQ_NO"> x
12        AND "RECORD_DAY" BETWEEN y AND z
13
```

FIG. 14

```
1   SELECT "SEQ_NO", "USER_DATA"
2   FROM TABLE(
3           ADB_CSVREAD(
4             MULTISET(
5               SELECT  "path"
6                 FROM  "File Management Table" AS "LOC",
7                       "Chunk Management Table" AS "CHUNK"
8                 WHERE "Schema Name"='USER'
9                   AND "Table Identifier"='TBL_01'
10                  AND "CHUNK"."ChunkID"="LOC"."ChunkID"
11                  AND "Archive State" = 'Y '
12                  AND "Range(MAX)">= y AND "Range(MIN)"<= z
13            ),
14            'COMPRESSION_FORMAT=GZIP;'
15          )
16        ) AS "TBL_01_ARC" ("SEQ_NO"     INTEGER,
17                           "USER_DATA"  VARCHAR(100),
18                           "RECORD_DAY" DATE)
19  WHERE "SEQ_NO" > x
20      AND "RECORD_DAY" BETWEEN y AND z
21
```

Lines 5–12: Third Partial Query

FIG. 17

```
1  SELECT  ($A)
2  FROM    ($B1), ($B2),... , ($Bn)
3  WHERE   ($C)
4
```

FIG. 18

```
1   SELECT ($A)
2   FROM   (
3          ┌ SELECT Column ($B1) that occurs in ($A), ($C)
4    First │ FROM   ($B1)
5   partial│ WHERE Condition regarding ($B1) among the conditions included in ($C)
6    Query │
7          └
8          UNION ALL
9
10         ┌ SELECT  Column ($B1) that occurs in ($A), ($C)
11         │ FROM    TABLE(
12         │            ADB_CSVREAD(
13         │               MULTISET(
14         │                  ┌ SELECT  "path"
15   Second│            Third │ FROM   "File Management Table" AS "LOC",
16  Partial│           Partial│         "Chunk Management Table" AS "CHUNK"
17    Query│             Query│ WHERE  "Schema Name" =Schema Name of ($B1)
18         │                  │   AND  "Table Identifier" =Table Identifier of($B1)
19         │                  │   AND "CHUNK". "ChunkID"="LOC". "ChunkID"
20         │                  │   AND "Archive State" = 'Y'
21         │                  └   AND Conditions regarding range(Min.) - range(Max.)
22         │                ),
23         │                'COMPRESSION_FORMAT=GZIP;'
24         │             )
25         │          ) AS "TBL_01_ARC" (Information of each column of ($B1))
26         └ WHERE Condition regarding ($B1) among the conditions included in ($C)
27
28         )
29         , ($B2),... , ($Bn)
30  WHERE  ($C)
31
32
```

DATA PROCESSING SYSTEM

TECHNICAL FIELD

The present invention relates to data processing systems.

BACKGROUND ART

Big data refers to collections of large datasets difficult to handle with traditional database management tools and data processing applications. In recent years, big data analysis has been utilized to discover business trends and the like.

As a result of its large size, big data cannot be managed with existing database systems. Accordingly, when handling such data in database systems, there may be occasions where the data collected most recently is stored in database tables, and data from before that is moved to archive files for storage. As archive files are not usually accessible via the access methods provided by database systems, such an operation makes it difficult to perform analysis or other operations that make use of the data recorded in the archive file.

In order to solve such a problem, technologies are considered for making archives accessible as a part of the database itself. For example, Patent Document 1 discloses a system that extracts data that matches a predetermined extraction condition from a database, moves the data to an archive file, and stores date information for the moved data in a dictionary. In this system, in response to receiving a data search request specifying a date, in addition to performing data retrieval from the database, it is possible to read out an archive file containing data for the specified date and perform data retrieval by referring to the dictionary.

CITATION LIST

Patent Literature

[Patent Document 1] Japanese Unexamined Patent Application Publication No. 2000-132442

SUMMARY OF INVENTION

Technical Problem

In order to perform processes such as retrieving desired data from a large data group such as big data in a realistic time frame, it is necessary to improve the access performance of the system. Parallel processing is one example of a technique for improving access performance. In the system disclosed in Patent Document 1, however, there is no consideration of parallel processing, and it is necessary to identify the archive files that include data of a specified date one-by-one and sequentially search archive files (or tables), such that it is difficult to improve the processing performance.

Solution to Problem

A data processing system according to an embodiment of the present invention manages one or more tables and a plurality of archive files including one or more records extracted from a table. In response to receiving a search request for a table, the data processing system generates a query (first partial query) to search for a record from the table corresponding to a condition specified by the search request and a query (second partial query) to identify the archive file including the record extracted (moved) from the table specified as a search target in the search request, and search the identified archive file for the record corresponding to the condition specified by the search request. Further, the first partial query and the second partial query may be used to generate a query to derive a union of these output results, and the processing related to the generated query may be executed in parallel.

Advantageous Effects of Invention

According to the present invention, the processing performance of large-scale databases can be improved.

BRIEF DESCRIPTION OF DRAWINGS

FIG. 2 is an example of a table in which target search data is stored.
FIG. 6 is a configuration example of a dictionary (SQL_TABLES).
FIG. 7 is a configuration example of a dictionary (SQL_COLUMNS).
FIG. 12 is an example of a query prior to rewriting.
FIG. 13 is an example of a query using a table function.
FIG. 14 is an example of a second partial query.
FIG. 17 is a general example of a query prior to rewriting.
FIG. 18 is a general example of a query after rewriting.

DESCRIPTION OF EMBODIMENT(S)

Hereinafter, embodiments of the present invention will be described with reference to the drawings. It is to be noted that the embodiments described below do not limit the invention according to the claims, and all the elements and combinations thereof described in the embodiments are not strictly necessary for implementing the solution of the present invention.

EMBODIMENTS (1) System Configuration

Figure 1:
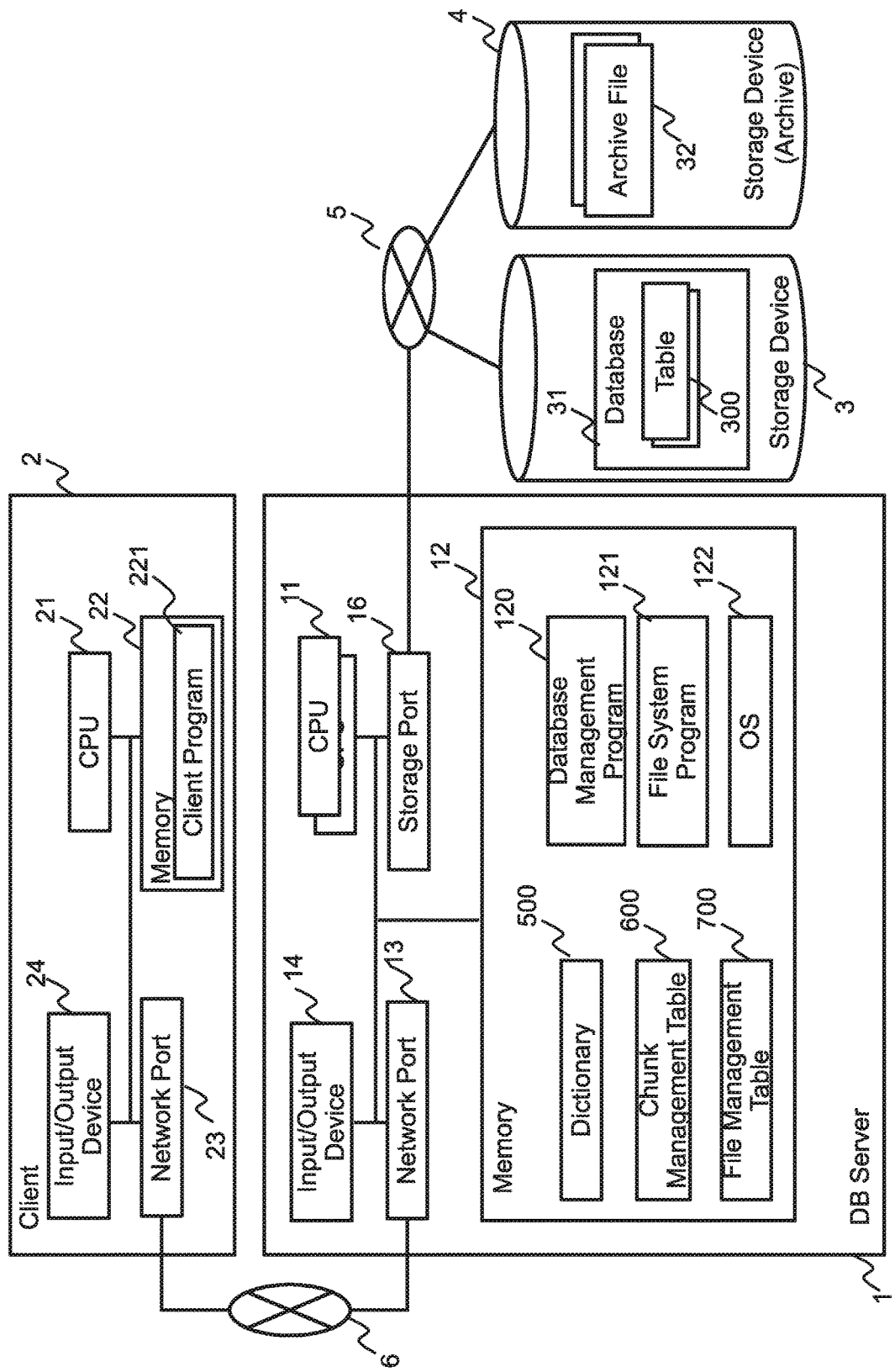
FIG. 1 is a configuration diagram of a data processing system.

FIG. 1 is a diagram illustrating a hardware configuration of a data processing system according to an embodiment of the present invention. The data processing system includes a database server 1 (hereinafter abbreviated as "server 1" or "DB server 1"), a client 2, and storage devices 3 and 4. The server 1 and the client 2 may be communicatively connected with each other via a local area network (LAN) 6 configured using Ethernet, for example. The server may be connected to the storage devices 3 and 4 via a network 5 (also referred to as a SAN 5) configured using a fiber channel (Fibre Channel), for example.

The server 1 is a computer for processing access requests for a database received from users of a data processing system, and may include a CPU 11, a memory 12, a network port 13 for connecting to the LAN 6, an input/output device 14, and a storage port 16. The memory 12 may be a storage device such as a DRAM, for example, and may be used to store control information and other data used when the CPU 11 executes the program or at program runtime. The CPU 11 may be a component that executes programs for performing database access processes. In the data processing system according to the present embodiment, the server 1 may be what is known as a Symmetric Multi-Processing (SMP) server, which has a plurality of CPUs 11, and each CPU 11 can execute processing in parallel. Note that, instead of providing a plurality of CPUs 11 in the server 1, a configuration may be utilized in which one multicore processor having a plurality of processor cores is provided in the server 1.

The input/output device 14 may include, for example, devices used when users input information, such keyboards and mice, as well as display (output) devices such as monitors and printers. The storage port 16 may be an interface for connecting the server 1 and the storage device 3.

The client 2 may be a computer used by a user to issue a reference update request to the database for the server 1 or to receive an output of a processing result returned from the server 1. The client 2 may include a CPU 21, a memory 22, a network port 23 for connecting to the LAN 6, and an input/output device 24. The CPU 21, the memory 22, the network port 23, and the input/output device 24 may be similar to the CPU 11, the memory 12, the network port 13, and the input/output device 14 of the server 1, respectively. In addition to the memory 22, the client 2 may include an auxiliary storage device such as a magnetic disk.

The storage devices 3 and 4 may be devices having nonvolatile storage devices such as magnetic disks, and may be devices for storing the database 31 and the archive file 32. The storage devices 3 and 4 may be devices such as disk arrays (or RAID), as they are known, that have a plurality of nonvolatile storage devices. The storage device 3 may be connected to the storage port 16 of the server 1 via the SAN 5.

In the data processing system according to the present embodiment, the data stored in the database 31 may be transferred to the archive file 32 after a certain period of time has elapsed. The archive file 32 may be stored on a storage device 4 that is separate from the storage device 3 on which the database 31 is stored. In the present embodiment, the storage device 4 on which the archive file 32 is stored may also be referred to as "archive 4." However, configurations in which the database 31 and the archive file 32 are stored on the same storage device 3 may also be utilized.

In addition, the storage device 3 and the archive 4 may be different types of storage devices. For example, in the storage device 3 on which the database 31 is stored, a storage device having better access performance than the archive 4 may be used. Also in the archive 4, portable storage mediums such as DVDs or magnetic tapes, as well as storage devices for accessing the portable storage mediums may be utilized.

Programs executed by the server 1 and control information used by those programs may be stored in the memory 12 of the server 1. Examples of programs executed by the server 1 include a database management program 120, a file system program 121, and an OS 122.

The OS 122 may be a program that performs schedule control of various programs to be executed on the server 1, and performs processes for providing abstracted hardware resources to various programs.

The file system program 121 is a program for storing and managing files and file management information in the storage device 4 or the like. In the present embodiment, the file system program 121 may mainly access the archive file 32 in which the data moved from the database 31 is stored, and when accessing the database 31, the file system program 121 may not be used. As another embodiment, however, configurations in which the database 31 may be stored in the file system (data structure for storing and managing files) created by the file system program 121 are also possible.

The database management program 120 may be a program sometimes called a relational database management system (RDBMS), and be configured to create and manage a relational database (database 31). In addition, the database management program 120 according to the present embodiment may be configured to access the archive file 32. The functions specifically provided by the database management program 120 will be described later.

In addition, a dictionary 500, a chunk management table 600, and a file management table 700 may be used as management information by these programs. A detailed description of these will be provided later.

The above-described programs and management information may be stored in the storage device 3 (or the not-shown auxiliary storage device incorporated in the server 1) when the server 1 is not in operation. When the server 1 is activated, these programs and management information may be read out from the storage device 3 into the memory 12, and may be used by the CPU 11 when they become necessary (when search processing or the like is performed). It should be noted that the server 1 may store programs other than the programs described above, as well as information other than the management information described above in the memory 12.

The client program 221 may be stored in the memory 22 of the client 2, and the CPU 21 may execute the client program 221. The client program 221 may be a program that provides a Graphical User Interface (GUI) or a Command Line Interface (CLI) for a user to submit an information search instruction.

(2) Configuration of Database and Archive File

Subsequently, the configuration of the database 31 and the archive file 32 handled by the data processing system of the present embodiment will be described. In the storage device 3, a database area (referred to as a database 31) for defining the table 300 and the like is defined, and one or more tables 300 may be defined in the database 31.

First, an example of the table 300 created by the server 1 is illustrated in FIG. 2. The table 300 may include a plurality of records having three columns of SEQ_NO (311), USER_DATA (312), and RECORD_DAY (313). However, the table 300 in FIG. 2 is merely illustrated as an example, and each record may have four or more columns.

In the present embodiment, the data (records) stored in the table 300 may include, for example, time series data. The time series data is, for example, a collection of measurement data continuously acquired from a data source such as a sensor device. The measurement data may be stored in the column USER_DATA (312) of the record in the table 300, and the date when the measurement data is acquired from the data source may be stored in the RECORD_DAY (313) of the record in which the measurement data is stored, for example.

Figure 3:
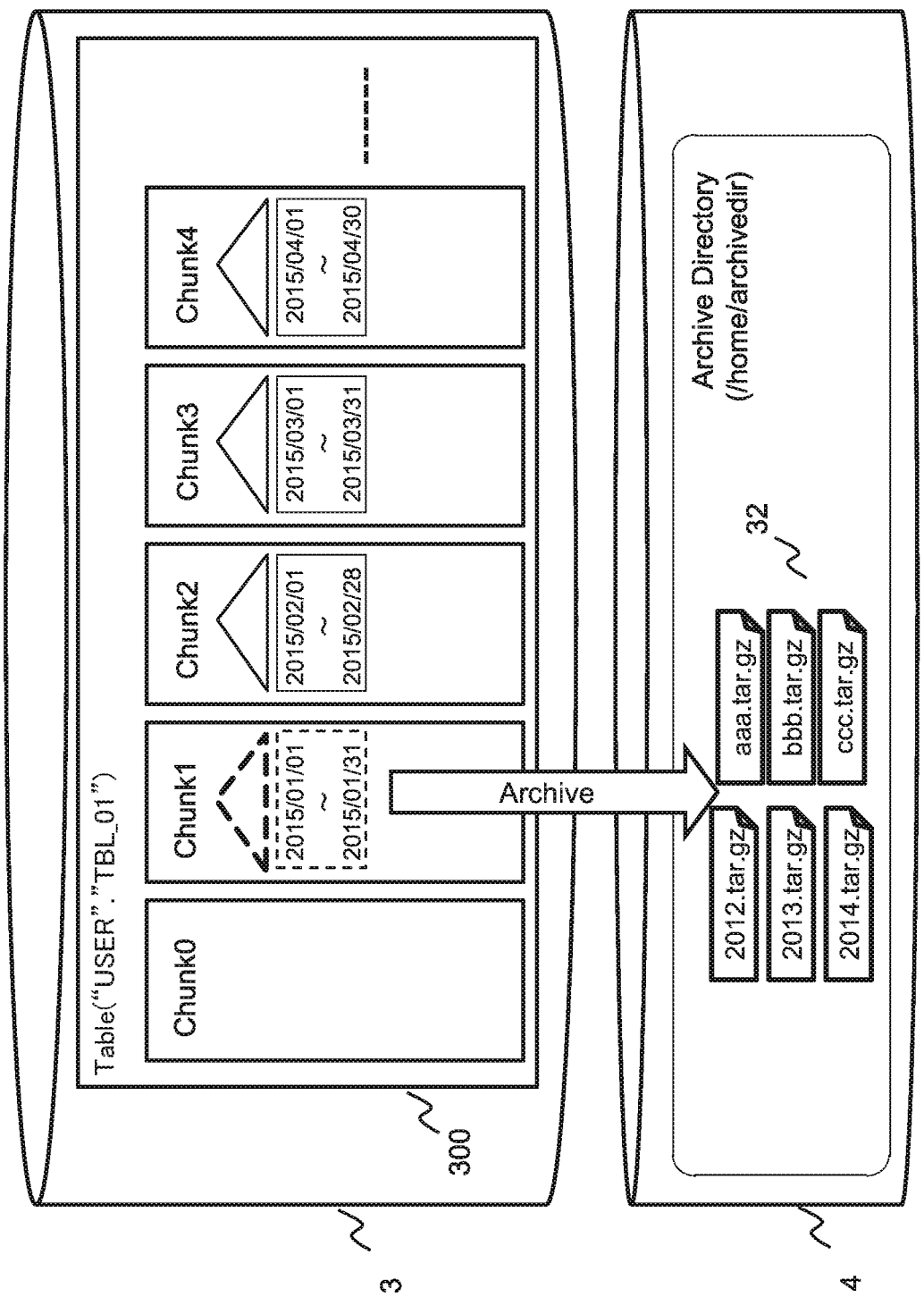
FIG. 3 is a diagram for explaining a configuration of a storage area in which a table and an archive file are stored.

The storage area of the storage device 3 in which the table is defined and the storage area of the archive 4 in which the archive file is stored will be described with reference to FIG. 3. In the present embodiment, when a record created using data acquired from a data source is stored in a table, the server 1 uses a program such as a data import tool (not shown in FIG. 1) to store a plurality of records in the table at once. In the present embodiment, a set of records loaded into a table at once by the data import tool is called a "chunk." The table may be structured to have a plurality of chunks. It should be noted that chunks may be something other than the above definition. For example, a set of records classified according to a specific condition may be defined as a chunk. Alternatively, a set of records stored in an area formed by dividing an area of the storage device 3 into sections of a predetermined size may be defined as a chunk. Also, a set of records having a plurality of these characteristics may be defined as chunks. For example, a set of records loaded at once by the data import tool into a partition (continuous area) of a predetermined size in the storage device 3 may be defined as a chunk.

As the data collected from the data source is continuously accumulated in the table 300, as time elapses the data stored in the table 300 becomes large. When the amount of data becomes large, the available space of the storage device 3 decreases, and data can no longer be stored. Accordingly, of the data stored in the table 300, the server 1 sequentially moves data to the archive 4 starting with the oldest data (records whose RECORD_DAY (313) dates are old). This process is referred to as an archive process.

When moving data to archive 4, the server 1 may create a file in archive 4, read the target movement records from table 300, and store them in the created file. This file may be referred to as an archive file. When the record is recorded in the archive file, it may be deleted from the table 300.

In the storage area of the archive 4, a data structure for file management, such as a directory, may be formed by the file system program 121. The directory in which the archive file is stored is predetermined, and this directory may be referred to as an "archive directory." The archive directory may be specified when the user defines a table.

Figure 4:
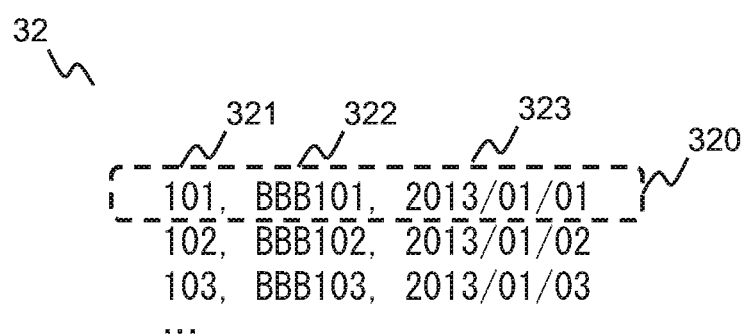
FIG. 4 is an example of the format of an archive file.

An example of the archive file 32 is illustrated in FIG. 4. In the present embodiment, a Comma Separated Value (CSV) format, as it is known, may be utilized as the file format of the archive file 32. However, file formats other than a CSV format may also be used. Also, when the archive file 32 is stored in the archive 4, the archive file 32 may be stored in a compressed state. The example illustrated in FIG. 4 shows the contents of an uncompressed archive file 32.

Each row of the archive file 32 corresponds to a record of the table 300. That is, each of the data objects stored in the columns of the record in the table (SEQ_NO (311), USER_DATA (312), RECORD_DAY (313)) may be listed in a form separated by commas. In FIG. 4, row 320 represents one record that was stored in the table, and each of the elements 321, 322 and 323 are information that were stored in SEQ_NO (311), USER_DATA (312), and RECORD_DAY (313) of the table, respectively. Hereinafter, unless otherwise specified, the rows of the archive file 32 may also be referred to as "records," similar to the records of the table 300.

The number of archive files 32 stored in the archive 4 is not limited to one. In the event that all the data of the table is stored in one archive file 32, the archive file 32 becomes too large, such that it may take an excessive time to read the archive file 32 when it becomes necessary to read from the archive file 32. Accordingly, when the server 1 transfers the data of the table to the archive 4, the data may be stored separately in a plurality of archive files 32.

(3) Functional Block Configuration

Figure 5:
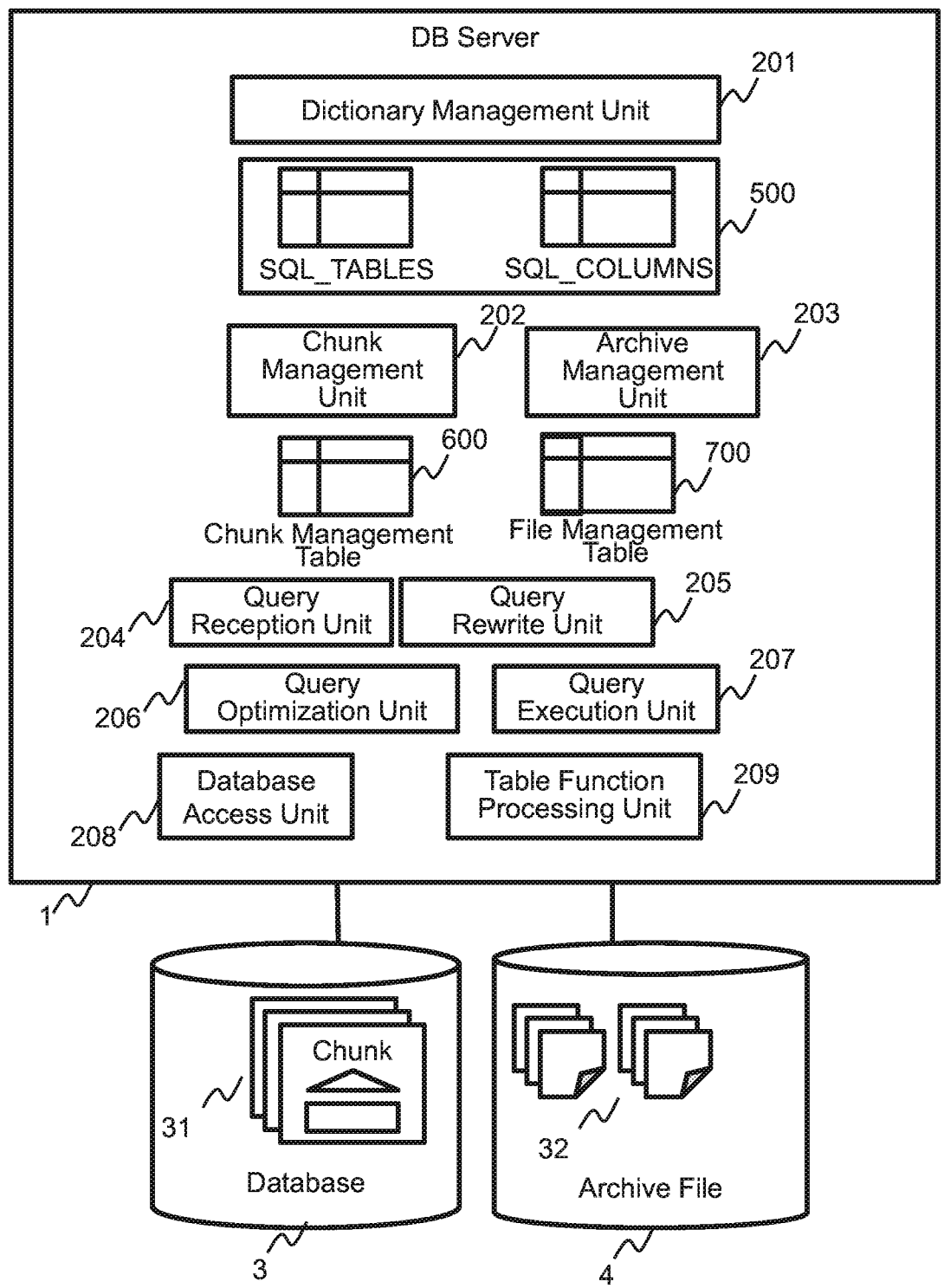
FIG. 5 is a functional block diagram of a server.

Next, functional blocks of the server 1 will be described with reference to FIG. 5. In the server 1 according to the present embodiment, the above-described programs (mainly the database management program 120) may be executed by the CPU 11, such that it may function as a device including a dictionary management unit 201, a chunk management unit 202, an archive management unit 203, a query reception unit 204, a query rewrite unit 205, a query optimization unit 206, a query execution unit 207, a database access unit 208, and a table function processing unit 209. The role of each functional block and the management information used by each functional block will be described below.

The dictionary management unit 201 may create a database table (table) according to a database table creation request received from a user. Upon creation of the table, the dictionary management unit 201 may record table definition information in the dictionary 500. The contents of the dictionary 500 will be described later.

The query reception unit 204 may receive a database access request from a user, cause the appropriate function block to perform a process related to the request, and return the processing result to the user. The DB server 1 according to the present embodiment may receive a database access request (referred to as a "query") described in a Structured Query Language (SQL) from the client 2 and perform query processing. The query rewriting unit 205 may be a functional block for rewriting the received query. A detailed description of the processing performed by the query rewrite unit 205 will be described later.

The query optimization unit 206 may be a functional block configured to analyze the received query and determine an execution procedure (execution plan) of the processes related to the query. The query execution unit 207 may perform processes such as the retrieval of records stored in the database table according to the process execution procedure determined by the query optimization unit 206.

The database access unit 208 may be a functional block configured to access the records stored in the table 300 within the database 31. The database access unit 208 may perform reads or writes of records according to an instruction from the query execution unit 207, and return a result to the query execution unit 207. For example, if the instruction from the query execution unit 207 is an instruction to search for a record, the database access unit 208 may read the record from the table 300 and return it to the query execution unit 207.

The table function processing unit 209 may be a functional block configured to read the archive file 32. The table function may be a function standardized in SQL 2003, and the database management program 120 according to the present embodiment may support table functions. The table function processing unit 209 may have functionality for reading out an archive file 32 (CSV file) and returning each row described in the archive file 32 to the query execution unit 207 as table format data.

The chunk management unit 202 may be a functional block configured to perform data load processing to the table 300 and also manage the chunk management table 600. Also, the archive management unit 203 may be a functional block configured to perform archive processing of data in the table 300, and manage a correspondence relationship between the archive file 32 and the table 300 stored in the file management table 700.

Note that, in the present embodiment, there may be places in which the contents of processes executed by the server 1 are described with functional blocks, such as the query rewriting unit 205, or programs as the subject. As described above, since the programs (primarily the database management program 120) may be executed by the CPU 11, the server 1 may operate as a device equipped with these functional blocks, such that it is accurate to say that the subject of the actual processing is the CPU 11 of the server 1. However, in order to prevent the explanation herein from being redundant, the flow of the various processes may be explained with programs or function blocks as the subject.

(4) Management Information

Next, the dictionary 500, the chunk management table 600, and the file management table 700 will be described. When the server 1 creates a table, attribute information and other data of the table to be defined may be recorded in the dictionary 500. An example of information recorded in the dictionary 500 when the table 300 shown in FIG. 2 is defined (created) will be described with reference to FIG. 6 and FIG. 7. The dictionary 500 may have SQL_TABLES (510) in which the attributes of the table 300 are stored, and SQL_COLUMNS (520) in which the attributes of each column of the table are stored. FIG. 6 illustrates the structure of SQL_TABLES (510), and FIG. 7 illustrates the structure of SQL_COLUMNS (520).

SQL_TABLES (510) may include one or more records having columns of a schema name (511), a table identifier (512), a table ID (513), an archive specification (514), and an archive directory (515). Each time a table is created, one record is created in SQL_TABLES (510). The schema name (511), table identifier (512), and table ID (513) may respectively be the name of the schema to which the created table belongs (generally, the user name of the user who instructed creation of the table), the identifier of the created table (a name specified by the user), and the identification number of the created table. As these are also information managed by known RDBMSs, a detailed description thereof will be omitted herein. Note that, in the present embodiment, a set of the schema name and the table identifier may be referred to as a "table name" in some cases.

The attributes of the table managed by the database management program 120 according to the present embodiment may also have information including an archive specification (514) and an archive directory (515). As described above, the archive management unit 203 of the DB server 1 according to the present embodiment may archive the records of the table 300 in the archive file 32, store the correspondence relationship between the archive file 32 and the table 300 in the file management table 700, and manage it. The archive specification (514) may be information that indicates whether or not the archive management unit 203 is a target table for archive processing. In the present embodiment, target tables for which the archive management unit 203 performs archive processing are referred to as "archivable tables." The archive specification (514) may be information that a user can specify. At the time of table definition, if a user instructs that a table is an archivable table, "Y" may be stored in the archive specification (514) of the table. In contrast, "N" is stored in the archive specification (514) of tables which are not archivable tables.

In the archive directory (515), when the record of a table is moved to the archive file, the directory name where the archive file is stored is recorded. The directory name where the archive file is stored is also specified by the user when defining a table.

SQL_COLUMNS (520) may include one or more records having columns of a schema name (521), a table identifier (522), a column name (523), a column ID (524), a data type (525), a data definition length (526), and an archive range column specification (527). The schema name (521) and the table identifier (522) may be the same information as the table identifier (512) and table ID (513) of SQL_TABLES (510), respectively. The column name (523) may be the name of the column created in the table, and the column ID (524) may be the identification number of the created column.

In the data type (525), the type of data to be stored in the created column may be specified. As illustrated in FIG. 7, the data type is, for example, an integer type (INTEGER), a character type (VARCHAR), or the like. In the data definition length (526), the length (maximum length) of the data stored in the created column is specified. The schema name (521) and the data definition length (526), etc., are information also managed by existing RDBMS. In contrast, the archive range column specification (527) is unique information managed by the database management program 120 according to this embodiment, and a detailed description thereof will be described later.

Next, a description will be provided of a method for managing the association between a table (in particular, chunks maintained in tables) and each archive file by the database management program 120 according to this embodiment. In some cases, a plurality of archive files 32 may be generated by the archive process. Accordingly, the database management program 120 may manage information for each archive file 32 using the chunk management table 600 and the file management table 700.

Figure 8:
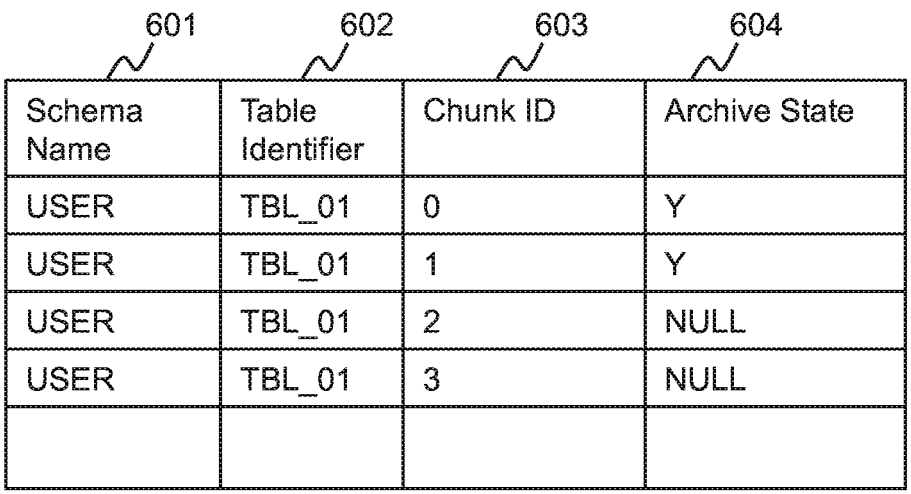
FIG. 8 is an example of a chunk management table.

An example of a chunk management table 600 is illustrated in FIG. 8. The chunk management table 600 may be information for managing the state of the data of each chunk (whether or not it is archived) that constitutes the table. One record may maintain information about one chunk.

Among the columns 601 to 604, the chunk ID 603 may be the identification number of a chunk. In the present embodiment, the chunk identification number attached to each chunk is referred to as a "chunk ID." The schema name 601 and the table identifier 602 may be the table names of the table 300 in which the chunk specified by the chunk ID 603 is used.

The archive state 604 is information indicating whether or not a record currently (or previously) stored in this chunk has been archived. When "Y" is stored in the archive state 604, this indicates that the record stored in this chunk has been archived. If the record stored in this chunk is not archived (still present in the table 300), NULL is stored in the archive state 604. The initial value of the archive state 604 is NULL.

When a plurality of records are loaded into the table 300 by the execution of a program such as a data import tool, the chunk (and the chunk ID of that chunk) included in the table 300 may be newly defined. When a chunk is defined, the chunk management unit 202 may create a record corresponding to the defined chunk in the chunk management table 600, and register the schema name 601, the table identifier 602, and the chunk ID 603 in the record created in the chunk management table 600 (the information registered in the schema name 601 and the table identifier 602 are the table name of the created table 300). Also, at this time, the archive state 604 of the created record is set to "NULL."

Figure 9:
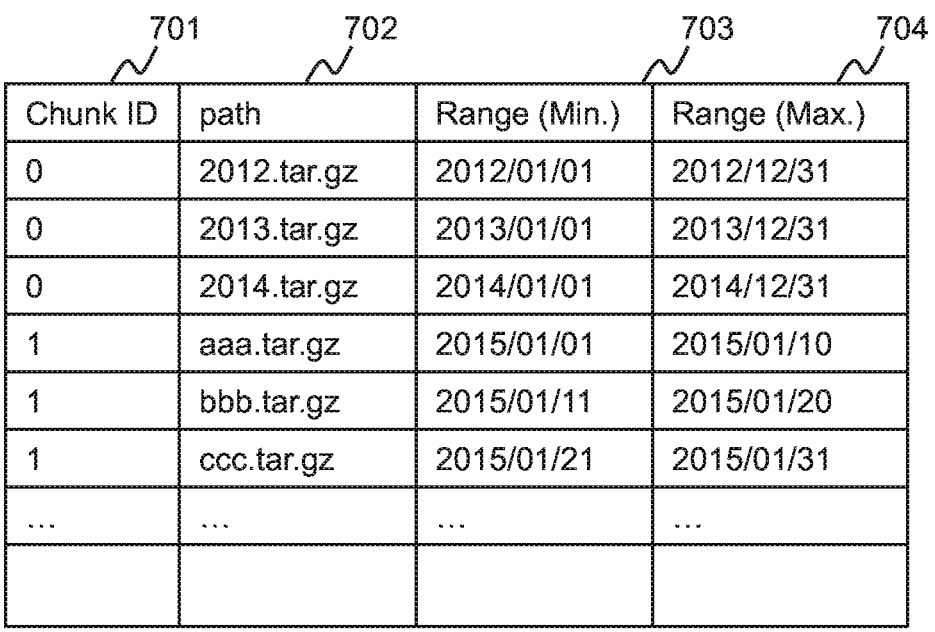
FIG. 9 is an example of a file management table.

Next, an example of the file management table 700 is illustrated in FIG. 9. The file management table 700 may be a table for storing information regarding each archive file, and the information of one archive file may be stored in one record.

The path 702 is the file name of the archive file. A relative path name may be used for the file name stored in the path 702. In particular, the relative path name from the directory recorded in the archive directory (515) of SQL_TABLES (510) may be recorded in the path 702. For example, as the path 702 in the leading row of FIG. 9 is "2012.tar.gz," and "/home/archivedir" is recorded in the archive directory (515) of SQL_TABLES (510), the record location of the archive file recorded in the leading row of FIG. 9 may be represented by an absolute path name of "/home/archivedir/2012.tar.gz.

In contrast, the chunk ID 701 may be information (a chunk ID) for specifying the chunk in which the record stored in the file (archive file) of the file name stored in the path 702 was stored before archiving. As the path 702 in the leading row of FIG. 9 is "2012.tar.gz," and the chunk ID 701 is "0," this indicates that the record stored in the archive file "2012.tar.gz" was originally stored in the chunk with the chunk ID of "0."

The range (Min.) 703 and the range (Max.) 704 represent a respective minimum value and maximum value of information in a particular column of a record recorded in the archive file. These pieces of information may be related to the archive range column specification (527) of SQL_COL-UMNS (520). In the following, the archive range column specification (527), the range (Min.) 703 and the range (Max.) 704 will be described by taking the records illustrated in FIG. 2 or FIG. 4 (or the records moved to the archive file) and the dictionary 500 of FIG. 6 as examples.

When searching for data in the archive file 32, the database management program 120 according to the present embodiment can perform filtering by referring to specific columns within the table. In the present embodiment, these specific columns are referred to as "archive range columns" or "range columns."

The range column may be specified by the user at the time of table creation (definition). The information regarding the columns specified in the range column may be recorded in the dictionary 500. In particular, it may be recorded in the archive range column specification (527) of SQL_COL-UMNS (520). For example, in FIG. 7, "Y" is recorded in the archive range column specification (527) of the record whose column name (523) is "RECORD_DAY," and the value of the archive range column specification (527) of the other records is "N." This indicates that among the columns of the defined table (the table specified by the schema name (521) and the table identifier (522)), the column "RECORD_DAY" (column 313 in the example of FIG. 2) is specified as the range column.

At the time of performing the archive process, the database management program 120 may create a record for storing the information of the created archive file 32 in the file management table 700. In addition, in the event that a range column is specified at the time of table definition, the database management program 120 may store, in the range (Min.) 703 and the range (Max.) 704 of the record created in the file management table 700, the minimum value and the maximum value of the range column of the record stored in the created archive file 32.

An example will be described with reference to FIG. 9. In the leading row of FIG. 9, information for the file "2012.tar.gz" may be recorded. The range (Min.) 703 and the range (Max.) 704 of the record of this row are "2012/01/01," and "2012/12/31," respectively. This represents that the column "RECORD_DAY" (range column) of the record recorded in the archive file "2012.tar.gz" has a minimum value of "2012/01/01" (the oldest date) and a maximum value of "2012/12/31" (the most recent date).

As information such as this is recorded in the file management table 700, the number of times the archive file 32 is read can be reduced. For example, when the database management program 120 receives a request from a user to retrieve a record with a RECORD_DAY after 2013, the database management program 120 may reference the file management table 700 to discover that records after 2013 are not stored in the archive file "2012.tar.gz." Accordingly, the database management program 120 can omit the process of reading out the contents of the archive file "2012.tar.gz."

In this embodiment, both the chunk management table 600 and the file management table 700 are tables managed by the database management program 120. Accordingly, when the server 1 accesses the records of the chunk management table 600 and the file management table 700, it can access them by issuing an SQL query. The attribute information of the chunk management table 600 and the file management table 700 may also be stored in the dictionary 500.

(5) Process Flow

In the following, the flow of processing executed in the data processing system will be described.

(5-1) Archive Process

First, the flow of the archive process will be described. The archive process may be executed periodically (once a year, once every 6 months, etc.). Alternatively, the server 1 may perform the archive process in response to the administrator of the data processing system issuing an archive instruction to the server 1 as a trigger. In the following, however, an example will be described in which the archive process is performed periodically.

The archive process may be executed by the archive management unit 203. The archive management unit 203 may identify the range column by referencing SQL_COL-UMNS (520), and archive those records among the records in the table 300 whose range column values fall within the predetermined range. Note that the archive process is only performed for those tables that can be archived.

In the following description, an example will be described in which the archive management unit 203 performs the archive process based on the premises (1) to (3) described below.

(1) The format of the target archive table 300 is as shown in FIG. 2, and the range column is RECORD_DAY.

(2) The archive process is performed periodically; for example, a cycle of once per year. Upon execution of the archive process, the archive management unit 203 may identify the record whose date is the oldest recorded in RECORD_DAY (313), and archive the records of the same year as the RECORD_DAY (313) of the record. That is, for example, if the value of RECORD_DAY (313) of the record with the oldest date is "2012/01/01," records with a year of 2012 recorded in RECORD_DAY (313) (records in which RECORD_DAY (313) is in the range of 2012/01/01 to 2012/12/31) may be moved to the archive file 32.

(3) Records stored in one archive file 32 are all chunks that were stored in the same chunk. In other words, when a record A is stored in chunk #0 and a record B is stored in chunk #1, the archive management unit 203 stores the record A and the record B in different archive files 32.

Figure 10:
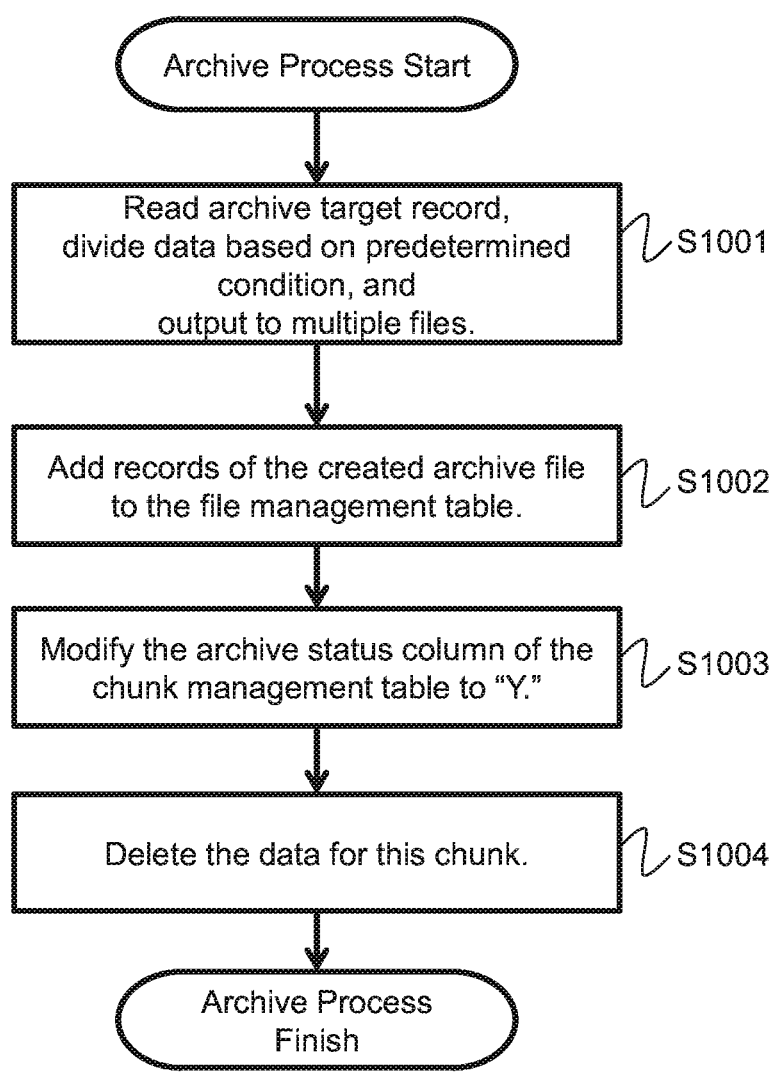
FIG. 10 is a flowchart of an archive process.

However, this is only an example, and the selection criteria for records to be moved to the archive file 32 in one archive process is not limited to the above-mentioned example. For example, as another example, an archive process may be performed based on a rule that a record stored in a predetermined number (n chunks) of chunks is to be archived in one archive process. Alternatively, records whose range column values fall within a range specified by a user may be archived. Hereinafter, the flow of the archive process will be described with reference to FIG. 10.

Step 1001: The archive management unit 203 may read out data to be archived in the current archive process from the table 300. At this time, it may be desirable for the archive management unit 203 to retrieve records from the table 300 by issuing an inquiry request to the query receiving unit 204 to read out data that has a RECORD_DAY (313) within a predetermined period.

Further, the archive management unit 203 may convert all the read records into CSV format records (for example, creating text of the format depicted in row 320 of FIG. 4). Then, the archive management unit 203 may create the archive file 32 in the archive 4 and store the converted records in the created archive file 32.

In the present embodiment, an upper limit may be set for the size of the archive file 32. When all the converted records are stored in the archive file 32, if the file size exceeds the upper limit, the archive management unit 203 may create a plurality of archive files 32, and divide the plurality of converted records into the plurality of archive files 32 for storage.

An example of division may be as follows. The archive management unit 203 may sequentially store the plurality of converted records in one archive file 32. When storing a converted record in the archive file 32, it may be desirable for records to be stored in order starting with the oldest (RECORD_DAY (313)) date. In this process, if the size of the archive file 32 exceeds a predetermined threshold, a separate archive file 32 may be created and the converted record may be stored in the separate archive file 32. By doing so, the archive management unit 203 may prevent the size of the created archive file 32 from exceeding the upper limit.

Step 1002: The archive management unit 203 may create a record for the created archive file 32 in the file management table 700. The chunk ID of the chunk in which the record stored in the archive file 32 existed may be stored in the chunk 701 of the record, and the file name of the archive file 32 is stored in the path 702. The range (Min.) 703 and the range (Max.) 704 may store the minimum value and the maximum value, respectively, of the range column (RECORD_DAY) of the record stored in the archive file 32.

Step 1003: The archive management unit 203 may modify, among the records of the chunk management table 600, the archive state 604 of the records that manage the information related to chunks whose records have been archived in the current archive process to "Y." Note that, in this archive process, records that were not moved to the archive file 32 may remain in the chunk. In that case as well, the archive state 604 is changed to "Y."

Step 1004: The archive management unit 203 may delete the records moved to the archive file 32 from those chunks whose records were archived in the current archive process, and end the process.

(5-2) Search Process

Figure 11:
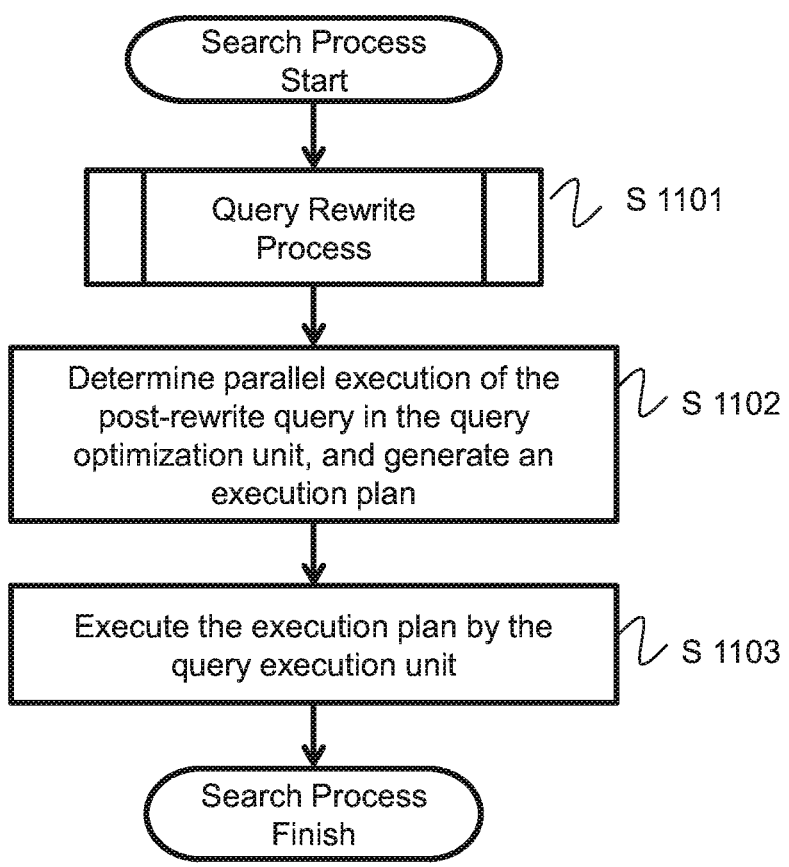
FIG. 11 is a flowchart of a search process.

Next, the flow of the search process will be described. FIG. 11 is a flowchart of the search process. The search process may be executed when the DB server 1 receives an inquiry (SQL query) from a user requesting a record search.

Step 1101: In response to receiving the SQL query from the client 2 used by the user, the query receiving unit 204 may pass the query to the query rewriting unit 205. The query rewriting unit 205 to which the query was passed may rewrite the received query.

Step 1102: The query rewriting unit 205 may pass the rewritten query to the query optimization unit 206. The query optimization unit 206 may generate an execution plan for the query. This process may be similar to that performed by existing RDBMSs.

Step 1103: The query optimization unit 206 may pass the execution plan for the generated query to the query execution unit 207. The query execution unit 207 may perform processing according to the execution plan. The query execution unit 207 may read out a record from the table 300 or the archive file 32 by using the database access unit 208 and the table function processing unit 209, and extract a record corresponding to the condition specified in the query from the read record. Next, the query execution unit 207 may return the extracted record to the query receiving unit 204. The query receiving unit 204 may output the returned result to the user (client 2).

This is the overall flow of the search process. The details of each step will be explained below.

(5-3) Query Rewrite Process

Here, the query rewrite process performed in step 1101 will be described. Before that, however, a descriptive example of a query provided by a user (referred to as a pre-rewrite query) and a query that has been rewritten in step 1101 (referred to as a post-rewrite query) will be described.

The query depicted in FIG. 12 is an example of an SQL query submitted by a user to the server 1 (pre-rewrite query). As SQL is well-known, only the outline of the query will be described herein. Note that the numbers attached at the head of each row of the query depicted in FIG. 12 are row numbers assigned for explanation.

The listed contents of the pre-rewrite query of FIG. 12 will be briefly described. The pre-rewrite query of FIG. 12 is a query configured to search for the table "USER.TBL_01" specified in the FROM clause of the second row. Hereinafter, the table specified in the FROM clause of the query may be referred to as a "target search table."

In addition, this query is a query that only extracts the records corresponding to the conditions specified in the WHERE clause of the third and fourth rows from the target search table "USER.TBL_01," and instructs output of the columns "SEQ_NO" and "USER_DATA." In particular, the condition specified in the WHERE clause indicates that the column "SEQ_NO" of the record to be extracted is larger than x, and that the range of "RECORD_DAY" is between y and z. Note that in practice, concrete values are specified for x, and specific dates are defined for y and z.

Also, in order to avoid complicating the description, FIG. 12 shows an example in which only one target search table is specified. However, in reality, more than one target search table may be specified in the FROM clause. A description of such an example will be provided later.

When a user issues a query to the server 1, the user may not be aware of whether or not a portion of the records of the table 300 are archived (whether or not they are moved to the archive file 32), and need not be aware of this. Accordingly, the user may simply issue a query to retrieve records from the table 300, as shown in FIG. 12, but does not issue a request to read data from the archive file 32.

However, when the target search table is an archivable table, as the data corresponding to the condition (such as the condition specified in the WHERE clause) specified in the query may be stored in the archive file 32, it is necessary for the server 1 to include the records within the archive file 32 (records converted into the CSV format) as search targets. Accordingly, when the target search table is an archivable table, the server 1 may rewrite the query to create a query that can search the archive file 32 in addition to the table 300.

The database management program 120 according to the present embodiment may use a table function for reading the archive file 32. FIG. 13 illustrates an example of a query for reading the archive file 32 described using a table function.

The query illustrated in FIG. 13 is a query for searching the archive file 32 (file 2014.tar.gz and aaa.tar.gz) similarly to the pre-rewrite query of FIG. 12. The difference between the query of FIG. 13 and the query of FIG. 12 is only the information specified in the FROM clause, and there is no difference other than that.

The function of the table function used here will be described herein. The function ADB_CSVREAD 0 described in the argument portion of the table function TABLE 0 is a function configured to output each row read from the file (CSV file) specified as the argument. TABLE 0 is a function configured to output text lines as table-formatted data. Note that, in the argument of ADB_CSVREAD 0, multiple file names can be specified. For example, in the event that ADB_CSVREAD (MULTISET [2014.tar.gz, aaa.tar.gz]) is listed, the files 2014.tar.gz and aaa.tar.gz may be read out. Also, the "COMPRESSION_FORMAT=GZIP" listed in the fifth row may be an argument specified when the file specified by the argument is in a compressed format. If the archive file 32 to be read is not in a compressed format, this argument may be unnecessary.

When the file name of the archive file 32 to be read is already known, the database management program 120 (that is, the CPU 11 of the server 1) may execute the query illustrated in FIG. 13 to perform a search similar to that of the pre-rewrite query of FIG. 12 with respect to the archive file 32. In practice, however, at the time that the query is received from the client 2, the file name of the archive file 32 to be read out is not known. Accordingly, it is necessary to perform a process to identify the file name of the archive file 32 to be read.

The chunk management table 600 includes the table name (schema name 601 and table identifier 602) of the table in which the chunk is used and the archive state 604 of the chunk. In the file management table 700, the name (path 702) of the archive file in which the records of the chunk are archived is included. Accordingly, in order for the database management program 120 to identify the archive file 32 in which the record stored in the target search table is archived, it may be desirable to perform the following processes (a) and (b).

(a) The schema name 601 and the table identifier 602 are matched with the name of the target search table from the chunk management table 600, and the chunk ID 603 of those chunks whose archive state 604 is "Y" may be identified.
(b) Further, from the records of the file management table 700, the path 702 of the record whose value of the chunk ID 701 is equal to the specified chunk ID 603 may be identified.

Instead of specifying the file name directly in the argument of the function ADB_CSVREAD 0, it is also possible to specify a function or query that outputs the file name. Therefore, the database management program 120 (the query rewriting unit 205) may create a partial query (referred to as a "third partial query") that performs the above (a) and (b), and create a query (referred to as a "second partial query") in which partial query 3 is described as the argument of ADB_CSVREAD. Then, by executing this partial query 2, the database management program 120 may specify the file name of the archive file 32 to be read and perform a search for the record in the identified archive file 32.

An example of the second partial query is illustrated in FIG. 14. The difference between FIG. 13 and FIG. 14 is that the third partial query, and not the specific file name, is described in the argument portion of the function ADB_CSVREAD 0 (see row 5 to row 12). The fifth to eleventh rows of the third partial query are queries for performing the processes (a) and (b) described above.

The conditions described in the last row of the third partial query (row 12 in FIG. 14) will be described herein. These conditions may be added in the case that conditions for the range column are listed in the WHERE clause of the query prior to rewriting. Hereinafter, the conditions for the range column included in the search condition are referred to as "range column conditions."

Referring to FIG. 12, a range column condition of ("RECORD_DAY" BETWEEN y AND z) may be present in the fourth row. In this case, it is inefficient to read archive files 32 which obviously do not include records whose (RECORD_DAY) range columns fall in the range of y to z. Therefore, when a condition for the range column is described in the WHERE clause of the query prior to rewriting, the database management program 120 (query rewriting unit 205) may add conditions for the range column to the third partial query to only read those archive files 32 which may possibly contain records corresponding to this condition. In this way, unnecessary reading of the archive file 32 is not performed.

The database management program 120 (query rewriting unit 205) may analyze the range column conditions included in the pre-rewrite query, and add conditions to the WHERE clause of the third partial query. The conditions to be added may be determined according to the following rules.

(Rule 1) When a condition of "Range column<A" is included in the range column condition, the query rewriting unit 205 may add a condition of "Range (Min.) 703<A" to the third partial query. By adding this condition, those archive files 32 whose range (Min.) 703 value is equal to or larger than A may be excluded from the search targets of the third partial query. The reason for adding this condition is that it is clear that archive files 32 that satisfy the condition "range (Min.) 703≥A" do not include records whose range column value is less than A. Similarly, when a condition of "range column≤A" is included in the range column conditions, a condition of "range (Min.) 703≤A" may be added to the third partial query.

(Rule 2) When a condition of "Range column>A" is included in the range column conditions, the query rewriting unit 205 may add a condition of "Range (Max.) 704>A" to the third partial query. By adding this condition, those archive files 32 whose range (Max.) 704 value is less than or equal to A may be excluded from the search targets of the third partial query. The reason for adding this condition is that it is clear that archive files 32 that satisfy the condition "range (Max.) 704≥A" do not include records whose range column value is larger than A. Similarly, when a condition of "range column≥A" is included in the range column conditions, a condition of "range (Max.) 704≥A" may be added to the third partial query.

Figure 15:
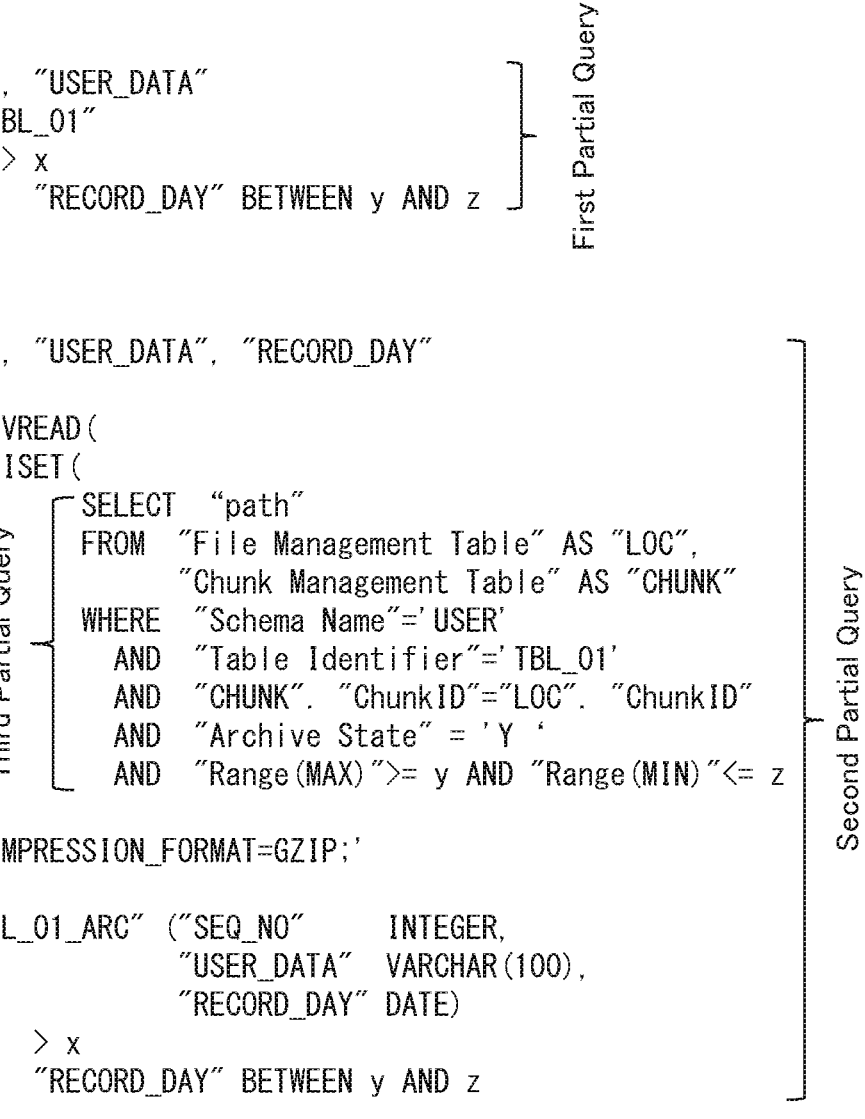
FIG. 15 shows an example of a query after rewriting.

The query rewriting unit 205 may create the above-described second partial query (the generation of the third partial query is also performed), and further create a query for obtaining a union of output results of the second partial query and a query for performing record search in table 300 (this may be referred to as a "first partial query"). In the present embodiment, this may be referred to as a post-rewrite query. FIG. 15 is an example of the pre-rewrite query of FIG. 12 after it has been rewritten. The portion described as the "first partial query" in the Figures is a query for performing a record search in the table 300, and in the present example, the content of the first partial query is the same as that of the pre-rewrite query. From the eighth row onward of FIG. 15 are queries for retrieving records from the archive file 32, which have the same contents as those of FIG. 14. In the post-rewrite query, the first partial query and the second partial query may be concatenated with the "UNION ALL" operator listed in the sixth row.

However, the first and third partial queries described above are merely examples, and it is not necessary to generate queries identical to those illustrated in FIG. 15 or elsewhere. It is sufficient to generate a query that can retrieve records corresponding to the conditions specified in the pre-rewrite query from both the table 300 and the archive file 32, as well as properly identify the archive file 32 that should be read. In addition, the processing actually performed by the query rewriting unit 205 according to the present embodiment may be somewhat different from the above description, and the listed contents of the rewritten query may also differ from those described in FIG. 15 in some cases. The processing performed by the query rewriting unit 205 in practice will be described below.

Figure 16:
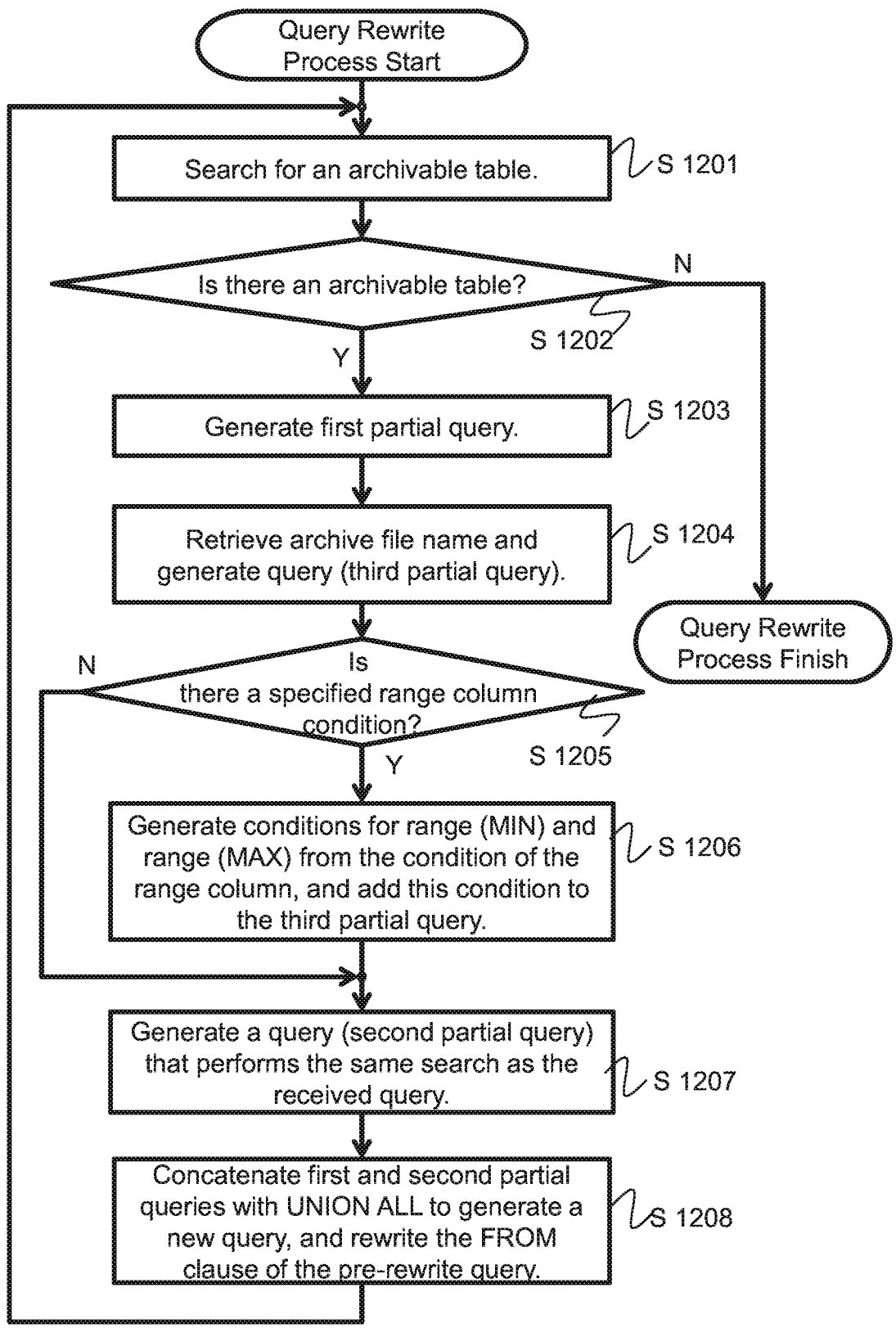
FIG. 16 is a flowchart of a query rewriting process.

Next, the flow of the query rewrite process will be described with reference to FIG. 16. In the following description, an example will be described of a case in which the query illustrated in FIG. 17 is provided as the pre-rewrite query. FIG. 17 is a more generalized example of the query described in FIG. 12. In the SELECT clause, the FROM clause, and the WHERE clause, a concrete column name, table name or condition specified by the user may be entered in practice, but in the following, in order to describe an example generalizing the query rewriting method, description will be performed with reference to a query in which the information specified in the query is replaced with variables such as ($ A), ($ Bn), ($ C) and the like.

The variable ($ A) included in the SELECT clause may represent a column name. Note that two or more column names may be specified by ($ A) (for example, in the example of the query in FIG. 12, two columns of "SEQ_NO" and "USER_DATA" are specified in a place corresponding to ($ A).

In addition, the variables ($ B1), ($ B2) . . . ($ Bn) may represent the table names of the search targets, respectively. Each of ($ B1), ($ B2) . . . ($ Bn) may correspond to one table name. Put differently, the query of FIG. 17 is an example of a case where there is a plurality of target search tables. Note that, in the following description, ($ Bx) may sometimes be referred to as "table ($ Bx)" (where x is an integer greater than or equal to 1 and less than or equal to n).

The variable ($ C) included in the WHERE clause may represent a condition specified by the query. Multiple conditions may be specified in ($ C). For example, in the example of FIG. 12, the condition [SEQ_NO>x] and the condition [RECORD_DAY "BETWEEN y AND z] are specified.

Here, of the tables ($ B1), ($ B2) . . . ($ Bn) specified in the FROM clause, in the event that table ($ B1) is an archivable table, a description of how the query rewriting unit 205 performs query rewriting will be described. FIG. 18 is an example of the pre-rewrite query of FIG. 17 after it has been rewritten, where the 3rd to 5th rows are the first partial query, and the 10th to the 26th rows are the second partial query. Within the second partial query, rows 14 to 21 represent the third partial query.

Step 1201: The query rewriting unit 205 may analyze the SQL query received from the query reception unit 204, and identify one table that can be archived among the target search tables (the tables listed in the FROM clause). In order to identify the archivable table, the query rewriting unit 205 may reference SQL_TABLES (510) and determine whether or not there is a table whose archive specification (514) is "Y" in the target search table.

Step 1202: As a result of step 1201, the query rewriting unit 205 may execute Step 1203 if there is an archivable table that has not undergone the processing from Step 1203 onward (Step 1202: Y). If there is no archivable table, or if the processing from Step 1203 onward has been performed for all archivable tables (Step 1202: N), the processing may terminate.

Therefore, if there is no archivable table among the target search tables of the received query, the query is not rewritten. Also, when the query depicted in FIG. 12 is passed to the query rewriting unit 205, as only one target search table name ("USER.TBL_01") is listed in the FROM clause of the query of FIG. 12, processing onward from Step 1203 is performed only once, and then the process may terminate.

Step 1203: The query rewriting unit 205 may generate a first partial query from the received query. As described above, the first partial query may be a query for retrieving records from a table specified by the received pre-rewrite query, and may be a query that is substantially similar in content to the pre-rewrite query.

As illustrated in FIG. 18, in the first partial query generated here, the columns listed in the variables ($ A) and ($ C) of the columns in the table ($ B1) are specified in the SELECT clause (row 3), and the conditions regarding the table ($ B1) of the conditions included in the variable ($ C) are specified in the WHERE clause (row 5). Also, a table ($ B1) may be specified in the FROM clause.

Step 1204: In Step 1204 to Step 1206, the query rewriting unit 205 may generate the third partial query. In Step 1204, the query rewriting unit 205 may generate a part of the third partial query other than the range column condition. In particular, the parts described in the 14th to 20th rows of the example shown in FIG. 18 may be generated.

The parts described in the 14th to 20th rows are queries for performing the above-described processes (a) and (b). That is, when the queries described in the 14th to 20th rows are executed, the schema name 601 and the table identifier 602 may be matched with the name of the table ($ B1) from the chunk management table 600, and the chunk ID 603 of those chunks whose archive state 604 is "Y" may be identified. Further, from the records of the file management table 700, the path 702 of the record whose value of the chunk ID 701 is equal to the specified chunk ID 603 may be identified.

Step 1205: The query rewriting unit 205 may further determine whether the range column condition is included in the pre-rewrite query (whether the range column is included in the search condition). If the range column is included in the search condition (Step 1205: Y), Step 1206 may be executed. If the range column is not included in the search condition (Step 1205: N), Step 1206 may be skipped.

Step 1206: This process is the process described using the example of the third partial query of FIG. 14, and is a process for adding a condition to the WHERE clause of the third partial query to prevent reading archive files 32 that do not include records corresponding to the range column condition. The query rewriting unit 205 may generate a condition using the range (Min.) 703 and the range (Max.) 704 according to the rules 1 and 2 described above, and add the condition generated here to the WHERE clause (row 21 in FIG. 18) of the third partial query created in Step 1204. Specific examples of the conditions generated here are as described above, and as such the description thereof will be omitted herein.

Step 1207: The query rewriting unit 205 may generate a second partial query that includes the third partial query(ies) created up to Step 1206. The information specified in the SELECT clause of the second partial query (row 10 of FIG. 18) and the WHERE clause (row 26 of FIG. 18) are the same as that of the first partial query. In the FROM clause of the second partial query, a table function is defined that includes the third partial query(ies) created up to Step 1206 as an argument.

Step 1208: The query rewriting unit 205 may generate a query that outputs a union of the output results of the first partial query and the second partial query created up to this point. In particular, as illustrated in FIG. 18 (row 3 to row 26), the query rewriting unit 205 may generate a query in which the first partial query and the second partial query are linked by the "UNION ALL" operator. Then, the table specified in the FROM clause of the pre-rewrite query may be rewritten to the query generated here. For example, when the table ($ B1) is selected in Step 1201, the ($ B1) portion of the FROM clause of the pre-rewrite query may be rewritten to the query generated here. In FIG. 18, an example in which ($ B1) is rewritten is illustrated. Thereafter, the query rewrite unit 205 may again execute the processing from Step 1201.

(5-4) Execution Plan Creation and Optimization

Finally, generation and execution processing of an execution plan performed in Step 1102 and Step 1103 will be described. As the process of generating the execution plan in the present embodiment is not largely different from that performed by existing RDBMSs, an outline of generation and execution processing of the execution plan in the present embodiment will be described.

In the data processing system according to the present embodiment, as the server 1 includes a plurality of CPUs 11, it is possible to execute several processes in parallel. Therefore, when generating an execution plan, the query optimization unit 206 may generate an execution plan in which, when there are a plurality of parallelizable processes, these processes are executed in parallel.

Processes that can be parallelized, for example, are processes that do not depend on each other. Conversely, processes with dependent relationships cannot be executed in parallel. For example, in the post-rewrite query described in FIG. 15 and elsewhere, the second partial query and the third partial query have a mutually dependent relationship. That is, since the second partial query cannot be executed until the third partial query is executed and the file name of the archive file 32 to be read is specified, the processing for these two queries is not parallelized. Accordingly, the query optimization unit 206 may generate an execution plan that executes the processing related to the second partial query after the execution of the third partial query is completed.

In contrast, there is no dependent relationship between the first partial query and the second partial query. In order to execute the first partial query it is necessary to read the table 300 in the storage device 3, and in order to execute the second partial query it is necessary to read the archive file 32 in the archive 4, but there is no mutually dependent relationship between reading of the table 300 and reading of the archive file 32 (there is no restriction such that the archive file 32 cannot be read until the table 300 is read). Therefore, the query optimization unit 206 may generate an execution plan that executes reading of the table 300 and reading of the archive file 32 in parallel, and causes the query executing unit 207 to execute the execution plan. In response to receiving such an execution plan, the query execution unit 207 may generate, for example, a task (thread) for reading the table 300 and a task for reading the archive file 32, and execute both of them in parallel. Note that, since the number of tasks that can be executed in parallel can differ depending on the configuration of the server 1 (the number of CPUs or processor cores, or the status of tasks being executed at the same time in the server 1, etc.), the query optimization unit 206 may determine whether or not to execute tasks in parallel according to the configuration of the server 1. In the case of a method of generating an execution plan by analyzing the query as in the present embodiment, it is also possible to dynamically change the number of tasks to be executed in parallel according to the state or configuration of the server 1. Accordingly, it is possible to efficiently execute processing related to the query.

In addition, when a plurality (for example, m) of archive files 32 to be read are specified as a result of execution of the third partial query, the reading process of the m archive files 32 can be executed in parallel. Therefore, the query optimization unit 206 may generate an execution plan for parallel reading of the archive file 32, and cause the query execution unit 207 to execute the execution plan.

As described above, when the archive management unit 203 creates the archive file 32, an upper limit may be placed on the file size so that the size of each archive file 32 is within a predetermined threshold value. As a result, the sizes of the archive files 32 to be generated are approximately equal (close to the threshold).

Therefore, when the query execution unit 207 executes reading of each archive file 32 in parallel, the time required for reading each archive file 32 is substantially equal. This is because the size of each archive file 32 is approximately equal. If there were variation in the size of each archive file 32 and the size of a particular archive file 32 were extremely large, it would take time to read this archive file 32 and the effect of parallel processing would be lost. As a result, it would take a long time to execute the second partial query. In the data processing system according to the present embodiment, as the sizes of the archive files 32 are kept within a predetermined threshold at the time of archiving, and the size of each archive file 32 is equalized, the effect of parallel processing may be easily obtained at the time of query execution.

Further, the table 300 may have a plurality of chunks. When a plurality of partitions (continuous regions) of a predetermined size are formed in the storage device 3 and each chunk is stored in each of these sections, it is possible to shorten the time required to read chunks by reading each chunk in parallel. Therefore, in this case, when generating the execution plan of the first partial query, the query optimization unit 206 may generate an execution plan that executes the data read from chunks in parallel. In this way, the speed of the read processing of the table 30 can be further improved.

Although the embodiments of the present invention have been described above, these are examples given for the purpose of explaining the present invention, and the scope of the present invention is not limited to these examples. That is, the invention can be implemented in a variety of other forms.

For example, in the data processing system according to the above-described embodiment, an example was described in which a client may be provided separately from the DB server, and a user may make use of the input devices and the output devices of the client. However, it is not essential to provide a client, and the DB server may be configured to execute a client program. In that case, the user may issue a request for information retrieval using the input/output devices of the DB server.

Also, the number of DB servers is not limited to one. A plurality of DB servers may be provided in the data processing system so that search processing or the like may be executed in parallel by the plurality of DB servers.

In addition, in the above-described embodiment, although the DB server maintains two tables (a chunk management table and a file management table) in order to manage the relationship between the table and the archive file, instead of maintaining two tables, it may be configured to maintain one table (provisionally referred to as an "archive management table") that has attributes retained by the chunk management table and attributes retained by the file management table. In that case, the third partial query generated by the DB server may become a query for retrieving the archive file name corresponding to the search condition from the archive management table.

The above-described various programs may be provided by a program distribution server or a storage medium readable by a computer, and may be installed in each device that executes the program. The computer-readable storage medium may be a non-transitory computer readable medium including a nonvolatile storage medium such as an IC card, an SD card, or a DVD, for example.

Also, the processing of part or all of the programs described in the above embodiments may be realized by dedicated hardware.

REFERENCE SIGNS LIST

1 Server
2 Client
3, 4 Storage Device
5 SAN
6 LAN

The invention claimed is:

1. A data processing system comprising:
a server, a first storage device, and a second storage device; and
wherein the server is configured to:
store, in the first storage device, one or more tables each including a plurality of columns holding data of one or more records, and
periodically execute an archive process to extract one or more of the records corresponding to a predetermined condition from the table, and, when an amount of the extracted records exceeds a predetermined threshold value, separately store the extracted records in a plurality of archive files in the second storage device, and, when the amount of the extracted records does not exceed the predetermined threshold value, store the extracted records in a respective archive file in the second storage device, and
wherein the server is further configured to:
generate, in response to receiving a search request, a first partial query to search for a record from the one or more tables corresponding to a condition specified by the search request,
generate a second partial query to identify one or more of the archive files including a record specified as a search target in the search request and search the identified one or more archive files for the record corresponding to the condition specified by the search request,
generate a query to derive a union of output results of the first partial query and the second partial query,
analyze the generated query, and
execute processing related to the query in parallel.

2. The data processing system according to claim 1, wherein the second partial query includes a table function for outputting data in the format of the tables from the one or more archive files.

3. The data processing system according to claim 1, wherein the server is further configured to:
generate a task related to at least the first partial query and a task related to the second partial query; and
execute the generated tasks in parallel.

4. The data processing system according to claim 1, wherein:
each of the tables includes a plurality of chunks which are sets of a plurality of the records; and
the server is further configured to:
analyze the first partial query,
generate a task for accessing a chunk included in the tables for each of the plurality of chunks; and
execute the tasks for accessing the chunks in parallel.

5. The data processing system according to claim 1, wherein the server is further configured to:
in the event that a plurality of the archive files are identified as a result of executing the second partial query, access the plurality of identified archive files in parallel.

6. The data processing system according to claim 1, wherein the server is further configured to:
receive, when a respective table is defined, a specification of a range column which is a column used for data filtering from among the plurality of columns,
create, when the archive process is executed, a file management table that records a minimum value and a maximum value of the range column of the records included in the archive files,
generate, when a condition of the range column is defined by the received search request, a third partial query to identify one of the archive files having a record corresponding to the condition of the range column by using the file management table; and
generate, as the second partial query, a partial query including the third partial query.

7. A data processing method for a data processing system including a first storage device and a second storage device, wherein the data processing system is configured to execute a data processing method comprising:
storing one or more tables each including a plurality of columns holding data of one or more records in the first storage device;
periodically executing an archive process to extract one or more of the records corresponding to a predetermined condition from the table, and, when an amount of the extracted records exceeds a predetermined threshold value, separately store the extracted records in a plurality of archive files in the second storage device, and, when the amount of the extracted records does not exceed the predetermined threshold value, store the extracted records in a respective archive file in the second storage device; and receiving a search request, and wherein processing the search request includes:

generating a first partial query to search for a record from the one or more tables corresponding to a condition specified by the search request;

generating a second partial query to identify one or more of the archive files including a record specified as a search target in the search request and search the identified archive files for the record corresponding to the condition specified by the search request;

generating a query to derive a union of output results of the first partial query and the second partial query;

analyzing the generated query; and executing processing related to the query in parallel.

8. The data processing method for the data processing system according to claim 7, wherein the processing related to the query includes:

generating a task related to at least the first partial query and a task related to the second partial query; and executing the generated tasks in parallel.

9. The data processing method for the data processing system according to claim 7, wherein:

executing, in the event that a plurality of the archive files are identified as a result of executing the second partial query, an access procedure to access the plurality of identified archive files in parallel.

10. The data processing method for the data processing system according to claim 7, further comprising:

receiving, when a respective table is defined, a specification of a range column which is a column used for data filtering from among the plurality of columns;

creating, when the archive process is executed, a file management table that records a minimum value and a maximum value of the range column of the record included in the created archive file;

generating the second partial query includes, when a condition of the range column is defined by the search request, generating a third partial query to identify the archive file having a record corresponding to the condition of the range column by using the file management table, and the second partial query includes the third partial query.

11. A non-transitory, computer readable storage medium storing a program for a processor configured to manage one or more tables including a plurality of columns and a plurality of archive files including one or more records extracted from the table, wherein the program causes the processor to execute a method comprising:

storing one or more tables each including a plurality of columns holding data of one or more records in the first storage device;

periodically executing an archive process to extract one or more of the records corresponding to a predetermined condition from the table, and, when an amount of the extracted records exceeds a predetermined threshold value, separately store the extracted records in a plurality of archive files in the second storage device, and, when the amount of the extracted records does not exceed the predetermined threshold value, store the extracted records in a respective archive file in the second storage device; and receiving a search request, wherein processing the search request includes:

generating a first partial query to search for a record from the one or more tables corresponding to a condition specified by the search request;

generating a second partial query to identify one or more of the archive files including a record specified as a search target in the search request and search the identified archive files for the record corresponding to the condition specified by the search request;

generating a query to derive a union of output results of the first partial query and the second partial query;

analyzing the generated query; and executing processing related to the query in parallel.

12. The computer readable storage medium according to claim 11, wherein the method further comprises:

receiving, when a respective table is defined, a specification of a range column which is a column used for data filtering from among the plurality of columns;

creating, when the archive process is executed, a file management table that records a minimum value and a maximum value of the range column of the record included in the created archive file;

generating the second partial query includes, when a condition of the range column is defined by the search request, generating a third partial query to identify the archive file having a record corresponding to the condition of the range column by using the file management table, the second partial query including the third partial query.

* * * * *